Dec. 24, 1946. G. D. SHAEFFER 2,413,081
CLUTCH DRIVEN HYDRAULIC PUMP
Filed May 22, 1943 2 Sheets-Sheet 1
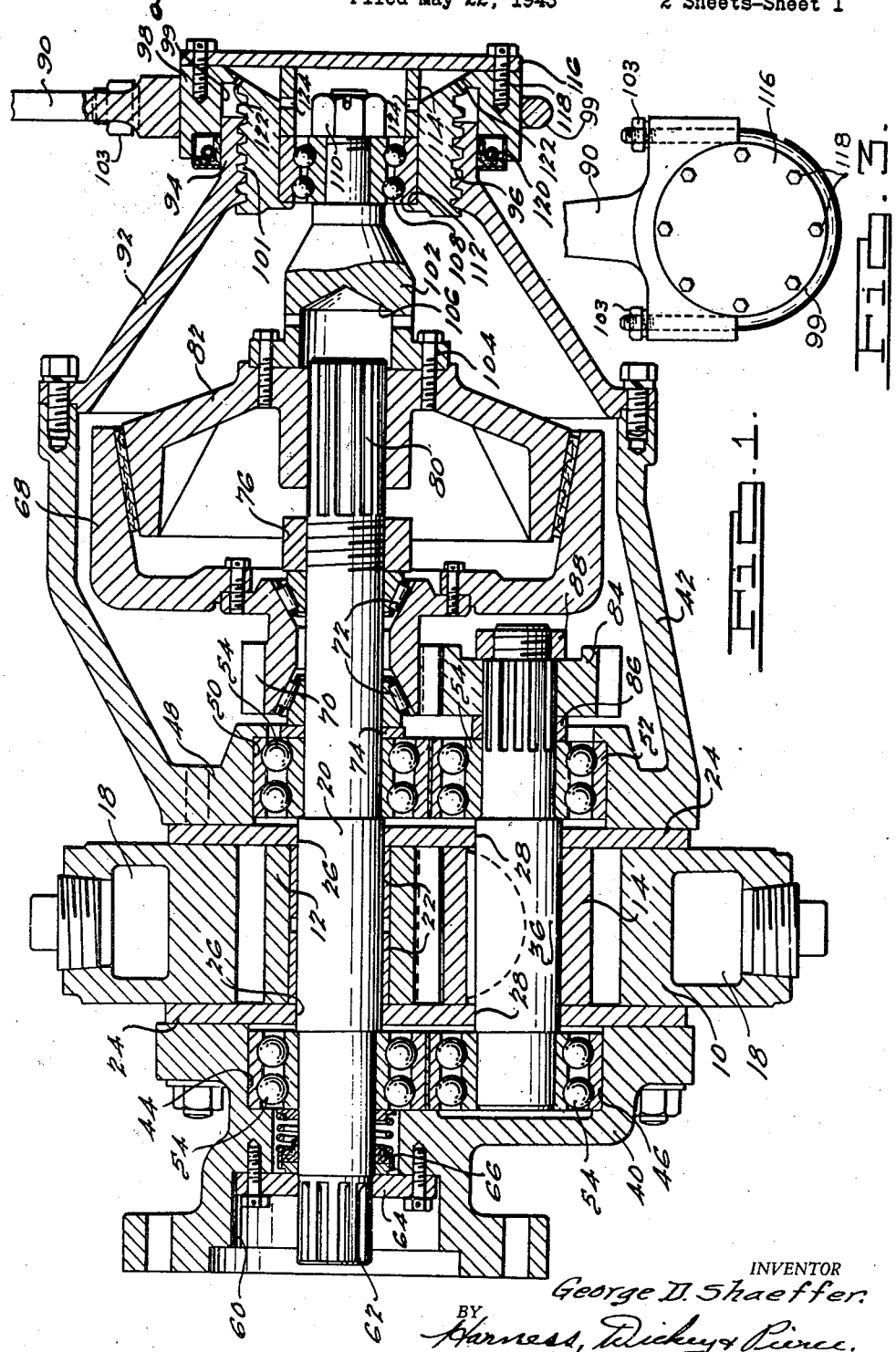
INVENTOR
*George D. Shaeffer.*
BY
*Harness, Dickey & Pierce.*
ATTORNEYS.

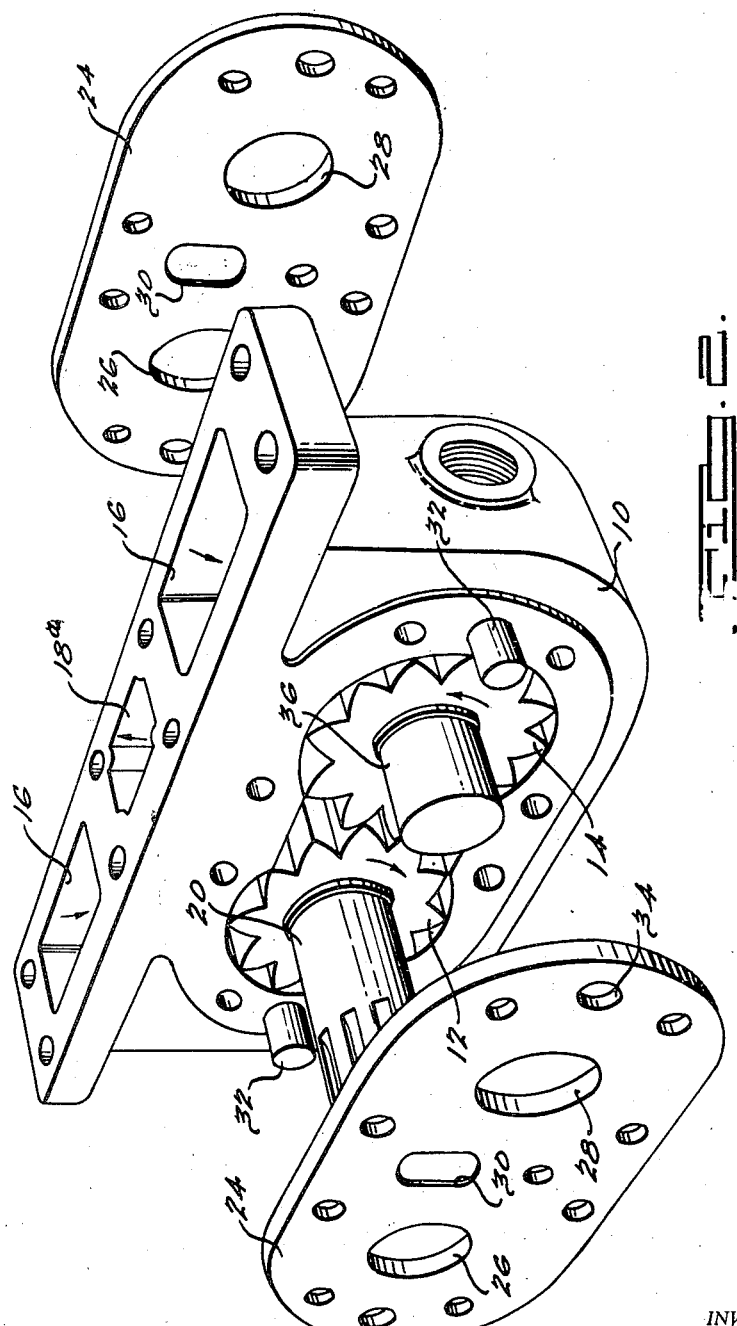

Patented Dec. 24, 1946

2,413,081

UNITED STATES PATENT OFFICE 2,413,081

CLUTCH DRIVEN HYDRAULIC PUMP

George D. Shaeffer, Detroit, Mich., assignor to Gar Wood Industries, Inc., Detroit, Mich.

Application May 22, 1943, Serial No. 488,023

3 Claims. (Cl. 103—126)

The present invention relates to road machinery, and particularly relates to a clutch operated pump construction particularly adapted for use on hydraulically operated road machinery.

One of the primary objects of the present invention is to provide improvements in constructions of the type mentioned which are particularly adapted for use on hydraulically operated road machinery and which result in cutting down the operating time of the pump to the times of operation of the scraper work elements in digging, dumping or leveling, or to the times of operation of the work elements of similar machines.

A further object of the invention is to provide improvements in constructions of the type mentioned in which the operating time of the pump is cut down so that the operating temperature of the oil is lower than in prior constructions, thereby increasing the efficiency of the pump and, further, in reducing wear on the pump parts.

A further object of the invention is to provide improvements in constructions of the type mentioned in which a larger capacity of pump can be used on road machinery, thereby making it possible to employ hydraulic actuating means in larger scraper classes than has heretofore been practical.

A further object of the invention is to provide improvements in constructions of the type mentioned, with the result that smaller reservoirs can be used with pumps of a given capacity than have heretofore been practical.

A further object of the invention is to provide improvements in pump and clutch assemblies whereby the clutch elements are accessible for servicing without disturbing the pump elements.

A further object of the invention is to provide improvements in gear pump constructions in which the drive is through one of the pump gears with the clutch at the rear of the pump, so that it is not necessary to carry the drive around the pump, thereby resulting in a compact and economical construction.

Other objects of the invention will become apparent from the following specification, the drawings relating thereto, and from the claims hereinafter set forth.

In the drawings, in which like numerals are used to designate like parts in the several views throughout:

Figure 1 is a cross-sectional view through a clutch driven gear pump assembly embodying features of the present invention;

Figure 2 is a separated, perspective view of the gear pump employed with the present invention, and Figure 3 is an end elevational view of a part of the structure shown in Figure 1, illustrating the manner in which the lever is mounted on the housing closure member.

In general, in hydraulically operated road machinery it has been the practice in the past to operate the pump continuously; that is, the pump is operated during the movement of the scraper between the loading and unloading positons, either when the scraper is loaded or empty, as well as during those periods when the jacks are operated. Operation of the pump during the idle work periods wastefully consumes power. This has resulted in inefficient operation in that the operating temperature of the oil is quite high, with many resultant disadvantages. The use of pumps on road machinery has heretofore been practically limited to pumps having a capacity of less than seventy-five gallons per minute, which limit is the result of the high operating temperature of the oil when the pump was continuously operated; and it was found that the bearings seized. With the structure of the present invention, larger capacity pumps can be used making it possible to use hydraulic operating means on the larger scrapers, such as thirty-five cubic yard scrapers.

Space and accessibility are important factors in road machinery construction, and with a structure of the present invention a smaller tank, or reservoir, may be used for a given size pump and the clutch and pump assembly is compact in that the drive passes directly through one of the gear pump elements.

Referring to the drawings a pump and clutch assembly is illustrated which comprises a casting 10 formed to provide the main or central pump housing portion. Such casting 10 is formed with the usual displacement chamber adapted to have rotatably mounted therein pump displacement members 12 and 14 which, in the embodiment illustrated, are intermeshing gear pump elements. The casting 10 is formed with inlets 16 which communicate with cored passageways 18, such passageways pass around the casting, join at the bottom and communicate with the displacement chamber through the usual inlet (not shown) located at the bottom central portion of the displacement chamber. The displacement members 12 and 14 are rotated in the direction indicated by the arrows and fluid, which is introduced through the inlets 16, passes out through an outlet passageway 18a which communicates with the displacement chamber at the upper central portion thereof.

The fluid, such as oil, is supplied from a suitable source, such as the usual tank or reservoir, and the outlet 18 communicates with a conduit leading to a distribution means.

The gear element 12 is freely mounted on a main drive shaft 20 which extends through the casting 10 and projects beyond both sides thereof. The gear 12 is mounted on the shaft 20 and has bearing bushings 22 interposed therebetween so that it may rotate freely with respect thereto.

Wear plates 24 provided with apertures 26 and 28 therethrough are disposed over the sides of the casting 10 in abutting relationship to the ends of the gear elements 12 and 14 to enclose the pump or displacement chamber, so that the oil is displaced around the periphery of the gears from the inlet to the outlet. The wear plates are preferably symmetrical and are provided with pressure relief spaces 30 on opposite sides thereof adjacent the outlet side of the intermeshing gears, so that such wear plates may be reversed when they become worn on one side. Guide dowels 32 may be formed integral with the casting 10 and are adapted to be received within apertures 34, formed in the wear plates 24, for proper positioning and holding the wear plates on the casting 10.

The gear element 14 is mounted on a pump drive shaft 36 and is keyed thereto. The shaft 36 projects through the apertures 28 and extends therebeyond.

An adapter member 40 is fitted over and bears against one of the wear plates 24, and a housing member 42 is mounted against the other wear plate 24. Suitable bolts may be passed through aligned apertures in the housing, the casting 10, the wear plates 24 and the adapter plate 40 for holding the assembly together.

The adapter member 40 is formed with bearing recesses 44 and 46 therein; and the housing member 42 is formed with an inwardly disposed flange 48 also formed to provide bearing recesses 50 and 52. Ball bearing assemblies 54, including inner and outer races with ball bearings disposed therebetween, are disposed within the bearing recesses 44, 46, 50 and 52 for rotatably mounting shafts 20 and 36.

One of the projecting ends of the shaft 20 extends within recess 60, formed in the adapter member 40 and is splined as indicated at 62 for connection with a power take-off or other suitable source of power. An end plate 64 is provided which has a central aperture therethrough through which the splined end of the shaft 20 extends and is fixed to the adapter plate as shown. An oil seal unit 66 is disposed in embracing relationship to the shaft 20 in the space between the plate 64 and the adjacent bearing assembly 54.

The opposite end of the drive shaft 20 extends within the housing member 42 and has a clutch means operatively connected thereto. Such clutch means is preferably of the cone friction type and includes an annular external clutch member 68 which is fixed to a drive gear 70 so that the drive gear 70 and the clutch member 68 rotate together. The clutch member 68 and gear 70 are mounted on shaft 20 for free rotation with respect thereto by means of conventional tapered roller bearing assemblies indicated at 72. Such roller bearing assemblies include the usual inner race with rollers disposed between the end of the race and the adjacent surfaces of the hub portion of the gear 70. A spacer collar 74 is mounted around the shaft and between one of the inner bearing races and the adjacent ball bearing assembly 54. The entire assembly is held in position by means of a lock nut 76 which is received over the threaded portion of the shaft 20 and abuts against the adjacent inner race of the thrust bearing. The clutch element 68 and the gear 70 are thus held against axial movement with respect to the shaft 20 but may rotate freely with respect thereto.

The inner end of the shaft 20 is splined as indicated at 80 and adapted to be splined to the inner friction cone member 82. The cone member 82 is thus driven by shaft 20 but may slide longitudinally with respect thereto. When it is moved into engagement with the clutch member 68 it will drive such clutch member and drive with it gear 70.

In order to drive the pump element 14 a gear 84 is splined to the inwardly projecting end of shaft 36 and is held in place between a spacer collar 86 and a lock nut 88. The gear 14, which is keyed to shaft 36 is thus driven and drives the intermeshing gear pump element 12 so that the fluid pressure is raised and the high pressure fluid passed to the distribution means as mentioned above. The pump is only driven when the clutch elements 68 and 82 are in engagement.

The means for shifting the clutch element 82 into and out of engagement with clutch member 68 includes a shifter lever 90 which is pivotally mounted on the outer end of a housing closure member 92 through means to be described. Such closure member 92 is fixed to the housing member 42 by means of suitable screws as shown. The member 92 is formed with a cylindrical end portion 94 which is internally threaded as indicated at 96. The shifter 90 is connected to an end cap 98 by means of a U-bolt 99 and the end cap 98 is formed with an annular recess 99a. The U-bolt passes through apertures in the base portion of the lever, which embraces a portion of the cap 98, and is pulled tightly thereagainst by nuts 103 which are threaded over the ends of the bolt. The cylindrical portion 94 is adapted to be received within the recess 99a. The inner wall of such recess is formed with threads 101 which are threadably received within the threads 96 so that as the shifter 90 and cap 98 are shifted the cap is caused to rotate and move longitudinally with respect to the housing 92.

The clutch member 82 has an axially extending connector 102 fixed thereto by means of screws 104. Such connector 102 is provided with an axial recess 106 into which the end of shaft 20 may extend when the clutch element 82 is moved longitudinally with respect thereto. The opposite end of the connector 102 is reduced and is received within ball bearing assembly 108. The inner race of such ball bearing assembly embraces the reduced end of the connector with one side of the inner race abutting against a shaft formed on the reduced portion and the other side of the inner race held in place by means of a lock nut 110 which is threadably received over the thread end thereof. The outer race of the ball bearing assembly abuts against an annular flange 112 formed on the inner end of member 98, and a tubular spacer member 114 abuts against the other side of the outer race. The assembly is held in place by means of an end plate 116 which is secured to the outer face of member 98 by means of screws 118.

It will thus be seen that as the lever 90 is rocked the member 98, to which lever 90 is fixed, is correspondingly turned and moves the clutch member 82 axially, thereby shifting it into and out of engagement with its cooperating clutch member 68.

An oil seal 120 may be provided between the outer surfaces of cylinder portion 94 and member 98. Oil passageways 122 and 124 are also preferably provided.

What is claimed is:

1. A pump and clutch assembly comprising pump housing means, means providing inlet and discharge ports in said housing means, a main drive shaft disposed within said housing means, a pump drive shaft parallel to said main shaft and disposed in said housing means, intermeshing fluid displacement members disposed within said housing means, one of said members being mounted on said main drive shaft for free rotation with respect thereto, the other of said members being mounted on said pump drive shaft and fixed thereto for rotation therewith, means to connect one end of the main drive shaft to a power take-off, clutch means connected to the opposite end of said main drive shaft, driving means interconnecting said clutch means and said pump drive shaft, and manual means to effect engagement and disengagement of said clutch means.

2. A pump and clutch assembly comprising pump housing means, means providing inlet and discharge ports in said housing means, a main drive shaft disposed within said housing means, a pump drive shaft parallel to said main shaft and disposed in said housing means, intermeshing fluid displacement members disposed within said housing means, one of said members being mounted on said main drive shaft for free rotation with respect thereto, the other of said members being mounted on said pump drive shaft and fixed thereto for rotation therewith, wear plates having apertures through which said shafts extend bearing against the axial ends of said members and cooperating with said housing means to provide a pump chamber, said shafts extending outwardly beyond said wear plates, means to connect one end of the main drive shaft to a power take-off, a clutch member fixed to the opposite end of said main drive shaft, another clutch member co-operable with said first-named clutch member mounted on said main drive shaft for free rotation with respect thereto, driving means interconnecting said second named clutch member and said pump drive shaft, and manual means connected to said first named clutch member to move said first named clutch member into and out of said driving engagement with said second named clutch member.

3. A pump and clutch assembly comprising pump housing means, means providing inlet and discharge ports in said housing means, a main drive shaft disposed within said housing means, a pump drive shaft parallel to said main shaft and disposed in said housing means, intermeshing gears disposed within said housing means, one of said gears being mounted on said main drive shaft for free rotation with respect thereto, the other of said gears being mounted on said pump drive shaft and fixed thereto for rotation therewith, wear plates having apertures through which said shafts extend bearing against the axial ends of said gears and cooperating with said housing means to provide a pump chamber, said shafts extending outwardly beyond said wear plates, means to connect one end of the main drive shaft to a power take-off, a clutch member fixed to the opposite end of said main drive shaft, another clutch member co-operable with said first named clutch member mounted on said main drive shaft for free rotation with respect thereto, driving means interconnecting said second named clutch member and said pump drive shaft, and manual means connected to said first named clutch member to move said first named clutch member into and out of said driving engagement with said second named clutch member.

GEORGE D. SHAEFFER.